(12) United States Patent
Nomura et al.

(10) Patent No.: US 8,770,842 B2
(45) Date of Patent: Jul. 8, 2014

(54) SLIDING MEMBER AND MANUFACTURING METHOD THEREOF

(75) Inventors: Satoshi Nomura, Toyota (JP);
Masaharu Hatta, Toyota (JP); Hiroshi Kanemitsu, Toyota (JP)

(73) Assignee: Taiho Kogyo Co., Ltd., Toyota-shi (JP)

( * ) Notice: Subject to any disclaimer, the term of this patent is extended or adjusted under 35 U.S.C. 154(b) by 0 days.

(21) Appl. No.: 13/704,092

(22) PCT Filed: Mar. 22, 2011

(86) PCT No.: PCT/JP2011/056729
§ 371 (c)(1),
(2), (4) Date: Dec. 13, 2012

(87) PCT Pub. No.: WO2012/014522
PCT Pub. Date: Feb. 2, 2012

(65) Prior Publication Data
US 2013/0089282 A1     Apr. 11, 2013

(30) Foreign Application Priority Data
Jul. 27, 2010   (JP) ................................. 2010-167816

(51) Int. Cl.
*F16C 33/02*     (2006.01)
(52) U.S. Cl.
USPC ........................................... 384/42; 384/625
(58) Field of Classification Search
USPC ......... 384/26, 27, 38, 42, 283, 284, 285, 293, 384/625, 276, 286, 291; 29/888.02; 148/565, 639
See application file for complete search history.

(56) References Cited

U.S. PATENT DOCUMENTS

| 2002/0104432 A1* | 8/2002 | Shimo et al. ...................... 92/71 |
| 2003/0000379 A1* | 1/2003 | Sugiura et al. .................... 92/71 |
| 2007/0266808 A1* | 11/2007 | Kanemitsu et al. ............... 74/60 |
| 2009/0205754 A1* | 8/2009 | Kanemitsu et al. ........... 148/500 |

FOREIGN PATENT DOCUMENTS

| JP | 02-173212 | 7/1990 |
| JP | 07-113421 | 5/1995 |
| JP | 2003-001364 | 1/2003 |
| JP | 2006-070838 | 3/2006 |
| JP | 2006-183627 | 7/2006 |
| JP | 2006-194220 | 7/2006 |
| JP | 2006-207503 | 8/2006 |
| WO | WO 2006/117901 | 11/2006 |

OTHER PUBLICATIONS

International Search Report for PCT/JP2011/056729 (2 pages).

\* cited by examiner

*Primary Examiner* — Phillip A Johnson
(74) *Attorney, Agent, or Firm* — Flynn, Thiel, Boutell & Tanis, P.C.

(57) ABSTRACT

A hemispherical shoe (sliding member) 1 has a flat sliding surface 3, which is quenched to form a quenched portion 7. A part of the quenched sliding surface is partially annealed to form an annealed portion 6. When an oil film pressure acts on the sliding surface 1, the annealed portion 6 is deformed by pressure so that the surface thereof has a concave portion 6A. In the annealed portion 6, a remaining quenched portion 8 may remain at the center part thereof. The concave portion 6A can be used as an oil reservoir or an oil flow path, so that an excellent seizure resistance can be ensured.

14 Claims, 10 Drawing Sheets

SLIDING MEMBER AND MANUFACTURING METHOD THEREOF

TECHNICAL FIELD

The present invention relates to a sliding member such as a hemispherical shoe and a manufacturing method thereof and, more particularly, to a sliding member capable of ensuring an excellent seizure resistance stability for a long period by improving a sliding surface of the sliding member and a manufacturing method thereof.

BACKGROUND ART

Conventionally, a sliding member has been known wherein convex portions with a height of 0.1 to several μm are formed by directly quenching a sliding surface of the sliding member in a dot shape or a line shape, and indirectly quenched portions adjacent to the directly quenched portions are formed relatively as concave portions, so that the sliding surface has an irregular surface formed by the directly quenched portions and the indirectly quenched portions. (Patent Literature 1)

In this sliding member, an excellent seizure resistance can be ensured by the convex portions or directly quenched portions, which are hardened by direct quenching; and concave portions or indirect quenched portions, which can be used as an oil reservoir or an oil flow path.

PRIOR ART DOCUMENTS

Patent Literature

Patent Literature 1: Japanese Patent Laid-Open No. 2006-70838

SUMMARY OF INVENTION

Problems to be Solved by the Invention

However, the height of the above convex portion is very minute, such as 0.1 to several μm, and thus a very small abrasion in the convex portion after a long-term use may easily cause a flat sliding surface. Such a flat sliding surface causes the above oil reservoir or oil flow path to disappear, thereby disadvantageously reducing the seizure resistance. In particular, when a sliding member has an entry of foreign matter or a poor lubrication, convex portions are easily abraded.

Further, even if the above convex portion is not abraded, it is found that the directly quenched convex portions are thermally shrunk, so that a sliding surface is at risk of becoming flat when the sliding surface has a high temperature due to a harsh use.

In consideration of such circumstances, regarding a sliding member such as a hemispherical shoe, which requires a high seizure resistance, the present invention provides a sliding member capable of ensuring an excellent seizure resistance, even in a long-term use or a high temperature of a sliding surface; and a manufacturing method thereof.

Means for Solving the Problems

Namely, the invention is a sliding member having a sliding surface slidable relative to a counterpart material, wherein at least the sliding surface of the sliding member is quenched so that a quenched portion is formed, a part of the quenched sliding surface is partially annealed so that an annealed portion is formed, and the annealed portion is deformable by pressure so as to have a concave surface when an oil film pressure acts on the sliding surface.

Further, the invention is a method for manufacturing a sliding member having a sliding surface slidable relative to a counterpart material, wherein the method comprises: forming a quenched portion by quenching the entirety of at least the sliding surface of the sliding member; forming an annealed portion by partially annealing a part of the quenched sliding surface; and further forming the surface of the quenched portion and the surface of the annealed portion flatly.

Advantageous Effects of Invention

According to the present invention, a quenched portion and an annealed portion are formed in a sliding surface. This annealed portion has a lower hardness than that of the quenched portion because it is formed by annealing the quenched portion. This allows the surface of the annealed portion to be deformed by pressure in a concave shape when an oil film pressure acts on the sliding surface, which enables the concave portion to be used as an oil reservoir or an oil flow path. Therefore, the present invention can ensure an excellent seizure resistance.

Further, the present invention does not use an extremely small convex portion with a conventional height of 0.1 to several μm as described above to ensure the seizure resistance. Thus, no problems such as decreases in the seizure resistance caused by abrasion of the convex portion or thermal shrinkage of the convex portion occur, and the excellent seizure resistance can be ensured even in the case of a long-term use or a high temperature at the sliding surface.

MODE FOR CARRYING OUT THE INVENTION

Figure 1:
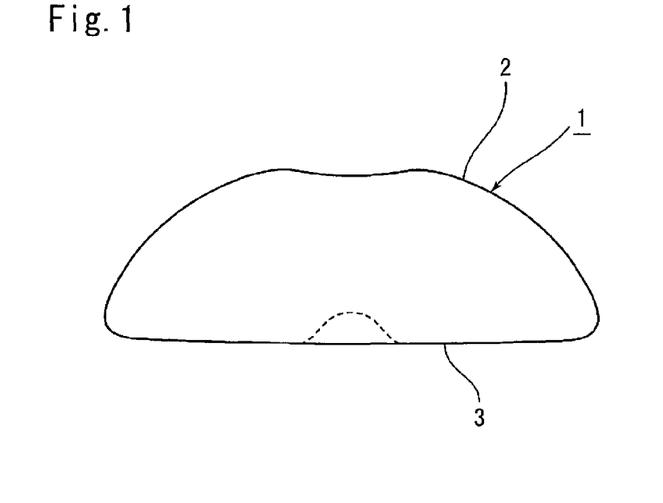
FIG. 1 is a front view showing an embodiment of the present invention.

The present invention is hereafter explained by referring to embodiments shown in the drawings. In FIG. 1, a hemispherical shoe 1 as a sliding member is used for a conventionally well-known swash plate compressor, and is interposed between a swash plate provided slidingly on a rotating shaft not shown and a hemispherical concave portion provided in a piston so the piston can be driven in a reciprocating manner by the rotation of the swash plate.

The above hemispherical shoe 1 has a hemispherical sliding surface 2 and a flat sliding surface 3 at an end surface side. The hemispherical sliding surface 2 is in a sliding contact with a hemispherical concave portion of the piston and the flat sliding surface 3 is in a sliding contact with the swash plate.

Figure 2:
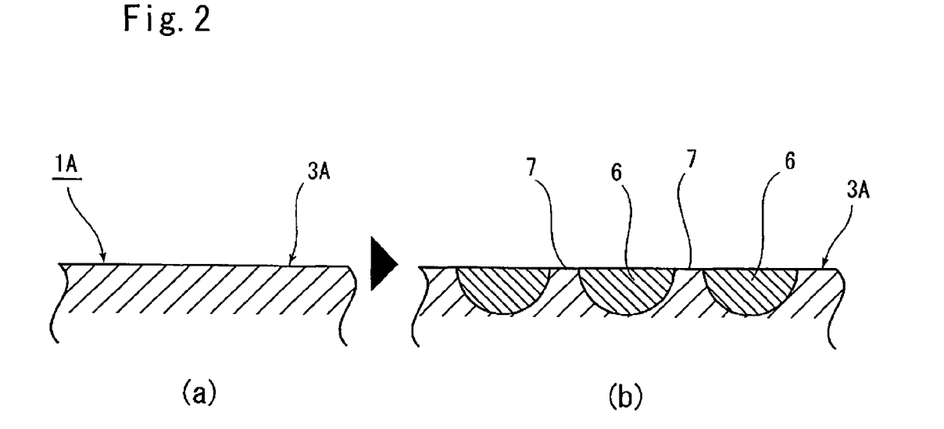
FIG. 2 is a process chart showing a manufacturing method of the present invention.

In a method for manufacturing a hemispherical shoe 1 shown in FIG. 2, a material such as low-carbon steel is formed in a required hemisphere shape by forging and the entirety thereof is quenched. FIG. 2(a) shows a flat sliding surface 3A of a hemispherical shoe material 1A formed in a hemisphere shape. A quenching process therefor is, as is conventionally well known, carried out by heating many hemispherical shoe materials 1A all together by means of a heating furnace not shown, and rapidly cooling them after heating to a required temperature. Then, when a low-carbon steel is used as a material, the quenched hemispherical shoe 1A has a hardness of about Hv 750, for example.

As the above material, usable are iron-based materials, aluminum-silicon alloys, copper alloys, pure titanium or titanium alloys, which can be quenched. The above materials may be surface-treated as long as they are capable of following up a surface elastic deformation. Further, as a counterpart material of a swash plate or the like, surface-treated high-strength brass, iron-based base materials, iron-based base material+copper alloy, aluminum-silicon alloy, iron-based base material+aluminum-silicon alloy, iron-based base material+resin coating or the like is preferably used.

After the hemispherical shoe material 1A is quenched, a part of the flat sliding surface 3A of the hemispherical shoe material 1A, in other word, a part of the quenched flat sliding surface 3A is annealed in a dot shape or a line shape, so that an annealed portion 6 is formed (FIG. 2(b)). This results in the formation of the annealed portions 6 and quenched portions 7 as other portions in the above sliding surface 3A. Then, the annealed portion 6 thus annealed has a hardness of about Hv 550, for example.

Thereafter, the above annealed portions 6 and the quenched portions 7 are polished by lapping processing or barrel processing to be smooth and flat, and the flat sliding surface 3 having annealed potions 6 and quenched portions 7 is completed.

The above dot-shaped or line-shaped annealed portion 6 may be formed in various shapes. The line-shaped annealed portion 6 may be formed in a parallel linear form (FIG. 3(a)), a concentric form (FIG. 3(b)), a helical or spiral form (FIG. 3(c)), a lattice form (FIGS. 3(d) and (e)) or a form wherein small circles (circular) are scattered (FIG. 3(f)). In addition, it may be in a radial form though not shown.

Figure 3:
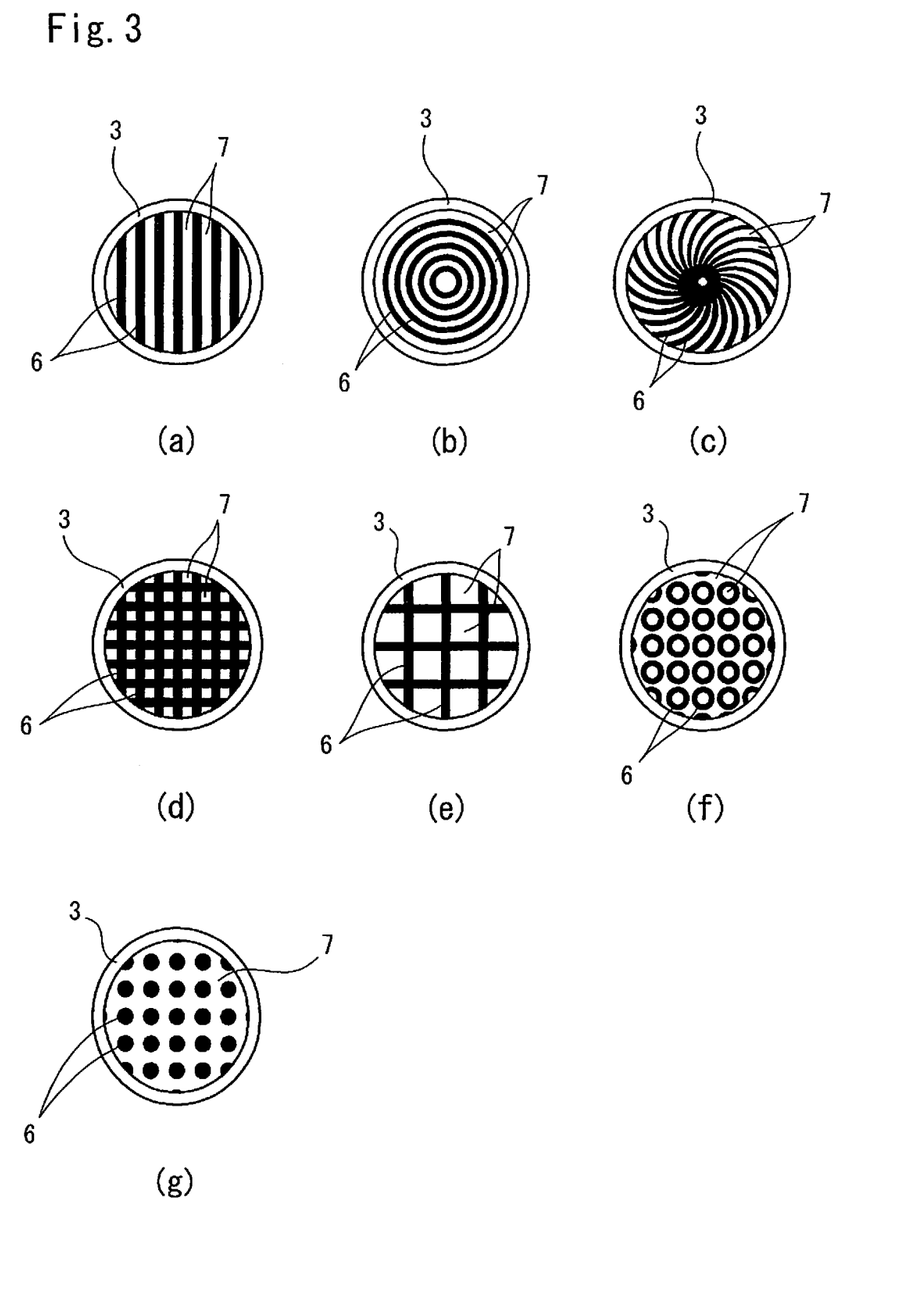
FIG. 3 is an explanatory drawing explaining the shape of an annealed portion 6.

Further, the dot-shaped annealed portion 6 can be formed literally in dot forms as shown in FIG. 3(g). Its shape may be a combination of two or more of the above-mentioned various forms.

As means for partially annealing a part of the above flat sliding surface 3A, a hot-grade heat source such as a YAG laser, $CO_2$ laser, electron beam, TIG arc, plasma arc or hot iron may be used.

When a laser is used for annealing, the annealing can be carried out by applying the laser to a portion to heat the applied portion, and thereafter, cooling the portion to a normal temperature by air-cooling. A heating temperature varies depending on the previous heat history of a material. When steel is quenched by a laser, it is necessary to heat an applied portion of the steel to a martensite starting point (about 727° C.) or more of the steel by laser application. However, in the case of annealing, it is needless to say that the portion is heated to a lower temperature in comparison with the temperature for the quenching.

Figure 4:
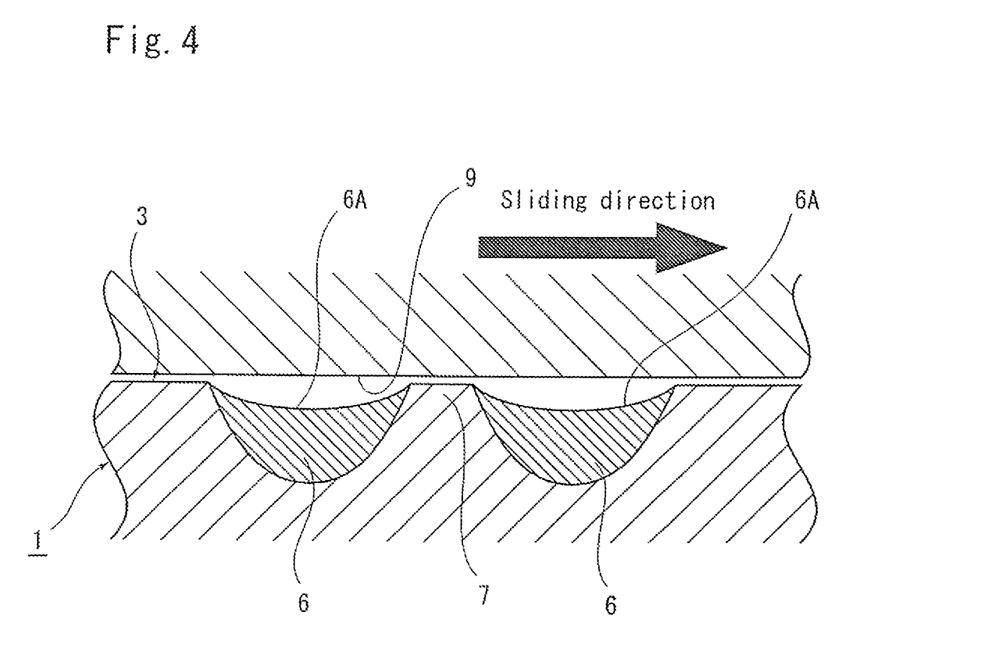
FIG. 4 is an explanatory drawing explaining operations of a product of the present invention obtained by the manufacturing method of FIG. 2.

In the flat sliding surface 3 having quenched portions 7 with a larger hardness and annealed portions 6 with a smaller hardness like above, when a large oil film pressure acts on the flat sliding surface 3, the annealed portions 6 are deformed by pressure in a concave shape relative to the quenched portions 7, so that the dot-shaped or line-shaped concave portions 6A are formed on the surface as shown in FIG. 4. It is added that reference numeral 9 denotes a counterpart sliding surface such as a swash plate. The above concave portions 6A function as an oil reservoir or an oil flow path according to the shapes. As indicated in test results below, these concave portions 6A can remarkably improve the seizure resistance of the hemispherical shoe 1.

The annealed portions 6 are deformed by pressure in a concave shape, and thereby the above concave portion 6A is formed and therefore, do not disappear even when the flat sliding surface 3 or the entire surface of quenched portions 7 or annealed portions 6 is abraded, so that a good seizure resistance can be kept for a long period. Further, even when the flat sliding surface 3 has a high temperature, it will not be adversely affected thereby, so that an excellent seizure resistance can be ensured even in a high-temperature state.

Figure 5:
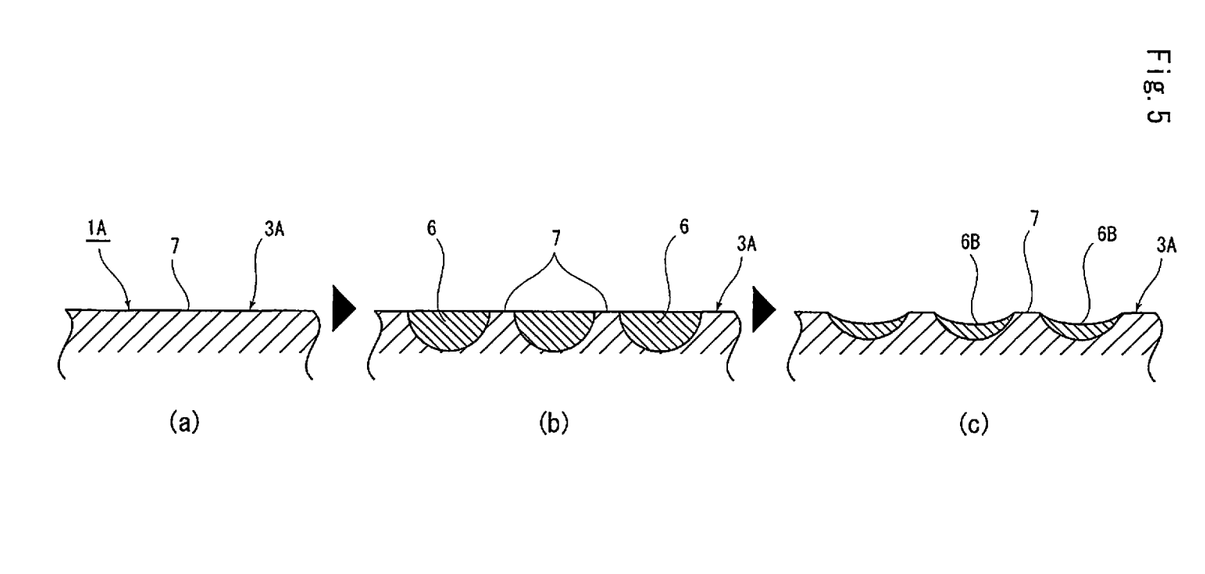
FIG. 5 is a process chart showing another manufacturing method of the present invention.

FIG. 5 shows a second embodiment of the present invention. In this embodiment, after the last process shown in FIG. 2 or after the annealed portions 6 and the quenched portions 7 are polished by lapping processing or the like to be flat, the surface of the annealed portions 6 are formed in a concave shape by buffing processing, so that concave portions 6B are formed in advance on the surface of the annealed portions 6.

As described above, even when the surface of the annealed portions 6 is flat, concave portions 6A are formed on the surface by the action of a large oil film pressure on the surface of the annealed portions 6. However, if concave portions 6B are formed in advance as in this embodiment, the concave portions 6B can be used as an oil reservoir or an oil path before the action of a large oil film pressure.

The above oil reservoir 6A is preferably formed so as to have a depth of about 1.0 μm.

Figure 6:
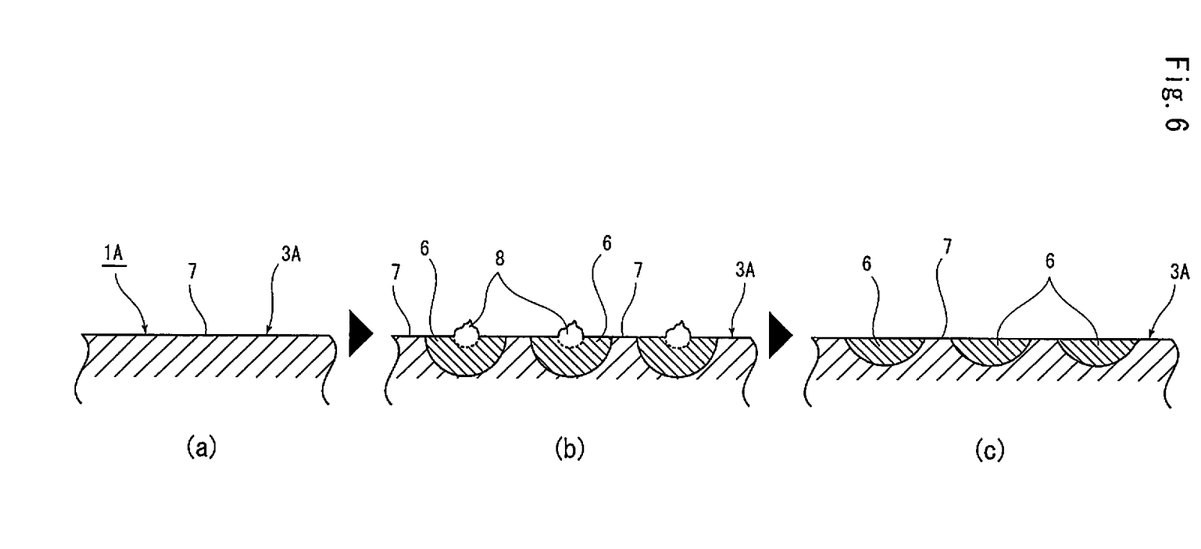
FIG. 6 is a process chart showing still another manufacturing method of the present invention.

Meanwhile, when a laser is used for annealing, apart of the quenched flat sliding surface 3A is annealed in a dot shape or line shape at a lower temperature in comparison with that for quenching described above and annealed portions 6 are formed (see FIG. 2(b)). At that time, quenching may be carried out in accordance with a heating condition, and a quenched portion 8 may remain at the center part of the annealed portion 6 as shown in FIG. 6(b).

This remaining quenched portion 8 remains through high-temperature heating and rapid cooling of the center part at the time of forming the annealed portion 6, thus remaining as a floating island at the center part of the annealed portion 6. This remaining quenched portion 8 is not formed continuously with the quenched portion 7 of the flat sliding surface 3 as a base material.

Then, the above remaining quenched portion 8 is not necessary for the present invention and it remains in a state wherein it projects from the surface of the flat sliding surface 3A. It is therefore desired to remove it when the above annealed portion 6 and quenched portion 7 are polished to be flat by lapping processing (see FIGS. 6(b) and (c)).

Figure 7:
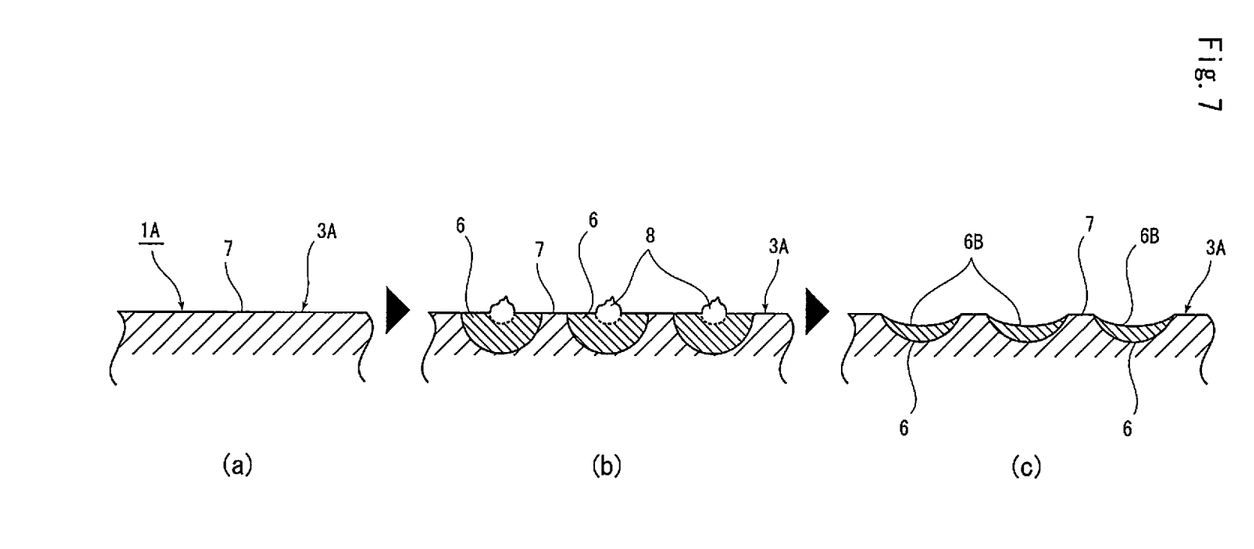
FIG. 7 is a process chart showing still another manufacturing method of the present invention.

Alternatively, depending on the depth or the size of the remaining quenched portion 8, the surface of the annealed portion 6 is formed in a concave shape by polishing or buffing processing so that the above remaining quenched portion 8 is removed (FIG. 7(c)) after annealed portions 6 with remaining quenched portions 8 are formed by annealing (FIG. 7(b)).

As described above, it is desired to remove the above remaining quenched portion 8, but it is not always necessary to completely remove the remaining quenched portion 8.

Figure 8:
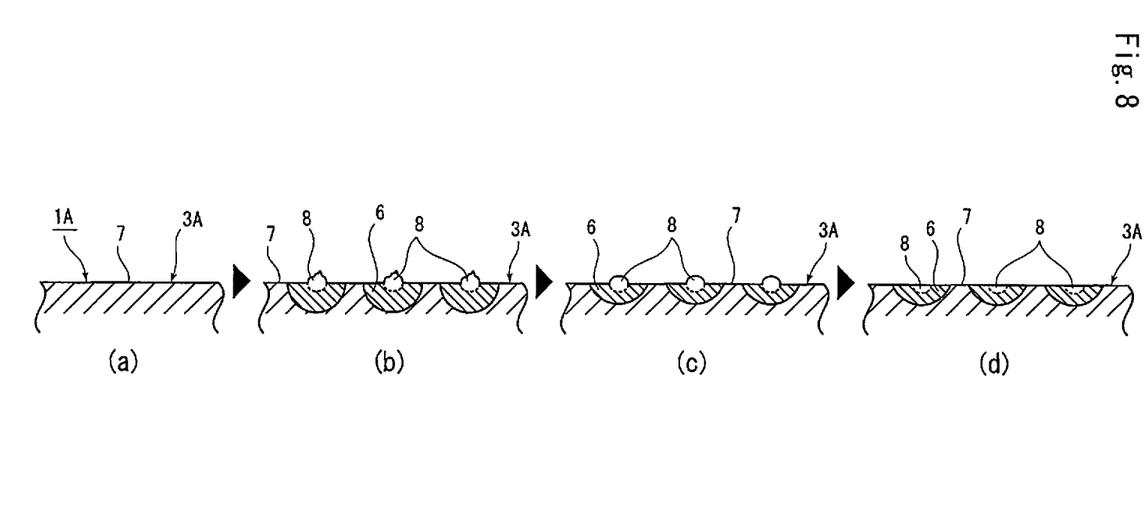
FIG. 8 is a process chart showing still another manufacturing method of the present invention.

In FIG. 8, while quenched portions 8 remain at the center part of annealed portions 6, both of the annealed portions 6 and quenched portions 7, including the remaining quenched portions 8, are polished so that the entire surface of the flat sliding surface 3A is flat and smooth.

More specifically, after annealed portions 6 having remaining quenched portions 8 are formed by annealing (FIG. 8(b)), the surface of the flat sliding surface 3A is processed by polishing or buffing processing so that its surface becomes smooth (FIG. 8(c)). At this stage, the remaining quenched portions 8 project from the surface of the flat sliding surface 3A formed of the annealed portions 6 and the quenched portions 7.

Then, the surface of the flat sliding surface 3A including the remaining quenched portions 8 are polished by a polishing method such as barrel polishing for a relatively long period so that the surface is flat (FIG. 8(d)).

Figure 9:
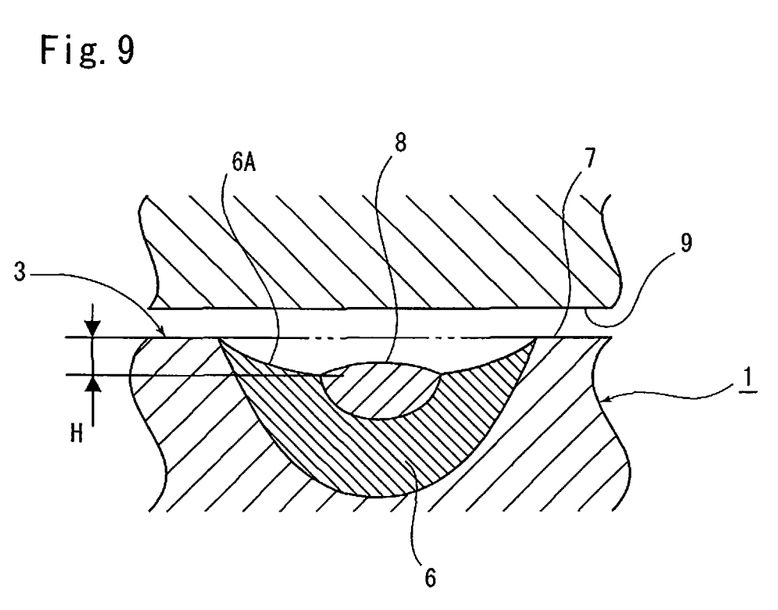
FIG. 9 is an explanatory drawing explaining operations of a product of the present invention obtained by the manufacturing method of FIG. 8.

In this way, if the entire surface of the flat sliding surface 3A including remaining quenched portions 8 are formed in a flat shape, the remaining quenched portions 8 recede from the entire surface of the flat sliding surface 3A at the time of forming concave portions 6A on the surface of the annealed portions 6 by the action of a large oil film pressure on the surface of the annealed portions 6 as shown in FIG. 9 since the remaining quenched portions 8 remain at the center part of the annealed portions 6.

Therefore, the remaining quenched portions 8 are not brought into contact with a counterpart sliding surface 9, and the same operational effects as explained in FIG. 4 can be obtained.

Alternatively, the surface of remaining quenched portion 8 may be concaved more actively.

Figure 10:
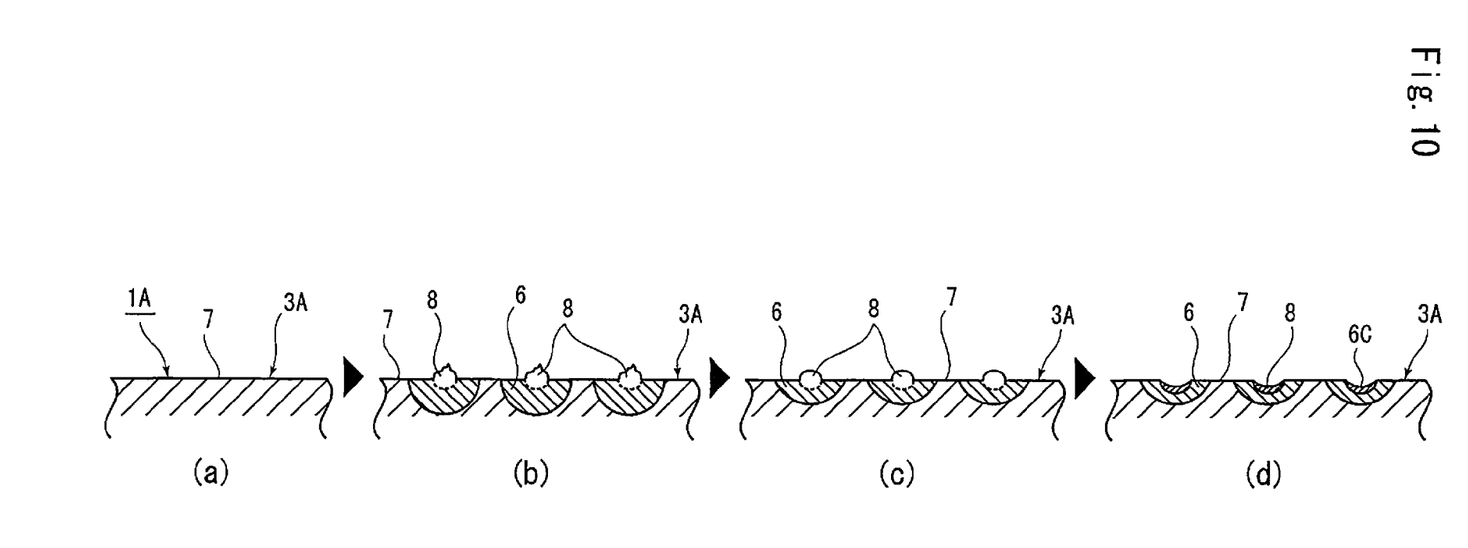
FIG. 10 is a process chart showing still another manufacturing method of the present invention.

FIGS. 10 (a) to (c) show the same manufacturing processes as FIGS. 8(a) to (c). After the surface of the flat sliding surface 3A is made smooth by polishing or buffing processing (FIG. 10(c)), the entirety of the hemispherical shoe material 1A is tempered at a low temperature.

At this low-temperature tempering process, the entirety of the hemispherical shoe material 1A is kept, for example, at 150° C. for 1 to 1.5 hours, and thereafter, is slowly cooled. This changes the remaining quenched portion 8 from a tetragonal martensite to a tempered martensite structure having a mixture of cubic martensite and carbide. Then, the remaining quenched portions 8 are shrunk, and the surface of the remaining quenched portions 8 recedes from the entire surface of the flat sliding surface 3A (FIG. 10(d)).

In this way, if concave portions 6C are formed by concaving the surface of the remaining quenched portions 8, the concave portions 6C can be used as an oil reservoir or an oil path before the action of a large oil film pressure. At this time, concave portions 6B may be formed in advance on the surface of the annealed portions 6 as explained for FIG. 5.

Further, if necessary, the remaining quenched portions 8 may be kept in such a state that they project from the surface of the flat sliding surface 3A formed of annealed portions 6 and quenched portions 7 as shown in FIG. 8(c) or FIG. 10(c).

In other words, after annealed portions 6 having remaining quenched portions 8 are formed by annealing (FIG. 8(b)), the surface of the flat sliding surface 3A is processed by polishing or buffing processing so that its surface becomes smooth (FIG. 8(c)) and the remaining quenched portions 8 may be kept in such a state that they project from the surface of the flat sliding surface 3A formed of the annealed portions 6 and the quenched portions 7.

Even in this case, if the remaining quenched portion 8 has a slight height of projection, it is possible to recede the remaining quenched portions 8 from the entire surface of the flat sliding surface 3A when concave portions are formed on the surface of the annealed portions 6 by the action of a large oil film pressure on the surface of the annealed portions 6.

Assuming that the remaining quenched portions 8 are in a sliding contact with the counterpart sliding surface, concave portions 6A formed on the surface of the annealed portions 6 can be used as an oil reservoir or an oil path. Also, the remaining quenched portions 8 having a large hardness prevent a large decrease in the seizure resistance, thereby ensuring a good seizure resistance.

Figure 11:
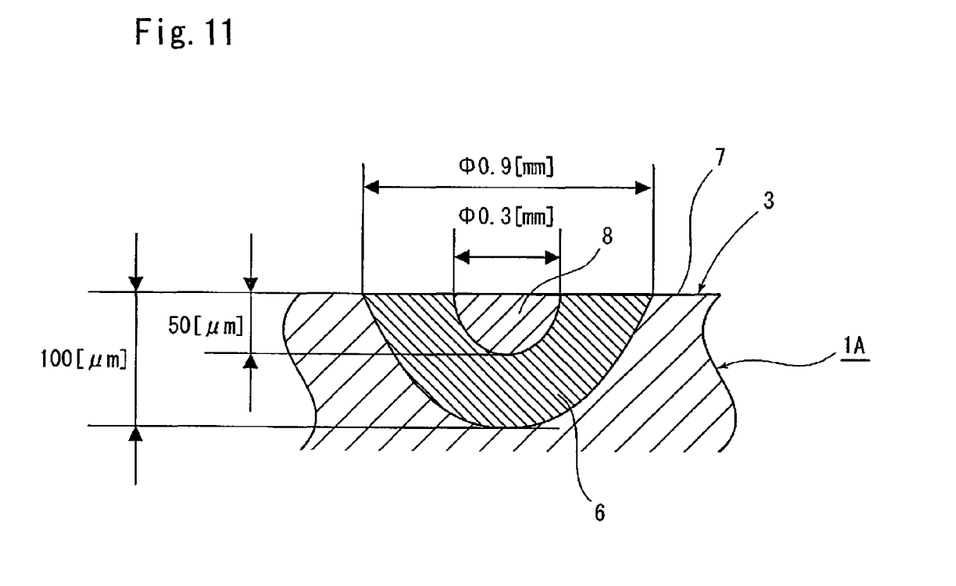
FIG. 11 is an explanatory drawing explaining the construction of a product of the present invention.

Next, FIG. 11 is an explanatory drawing explaining operational effects of a product of the present invention by simulation.

As shown in FIG. 11, a product of the present invention is formed as having an annealed portion 6 with a diameter of 0.9 mm formed in a dot shape in a quenched material 1A having a hardness of Hv 750 in this simulation. This annealed portion 6 is formed in a hemispherical shape in the material 1A and has a depth of 100 μm.

In addition, a remaining quenched portion 8 remains at the center of the surface of the annealed portion 6. The remaining quenched portion 8 is formed in a hemispherical shape in the annealed portion 6 and has a diameter of 0.3 mm and a depth of 50 μm. Then, the surfaces of the quenched material 1A, the annealed portion 6 and the remaining quenched portion 8, or the entire surface of flat sliding surface 3A is formed to be flat.

When a pressure of 50 MPa, which may occur between a hemispherical shoe and a swash plate in a car air-compressor, was applied to a sliding surface of the product of the present invention having the above construction, the annealed portion 6 was concavely deformed as shown in FIG. 9, so that a concave portion 6A was formed on its surface and the concave portion 6A had a depth H of 0.01 μm.

At this time, the surface of the remaining quenched portion 8 is formed to be flat matching the entire surface of the flat sliding surface 3A in advance, thus receding from the entire surface of the above flat sliding surface 3A in accordance with the concave deformation of the annealed portion 6 and not bringing it into contact with a counterpart sliding surface 9.

Figure 12:
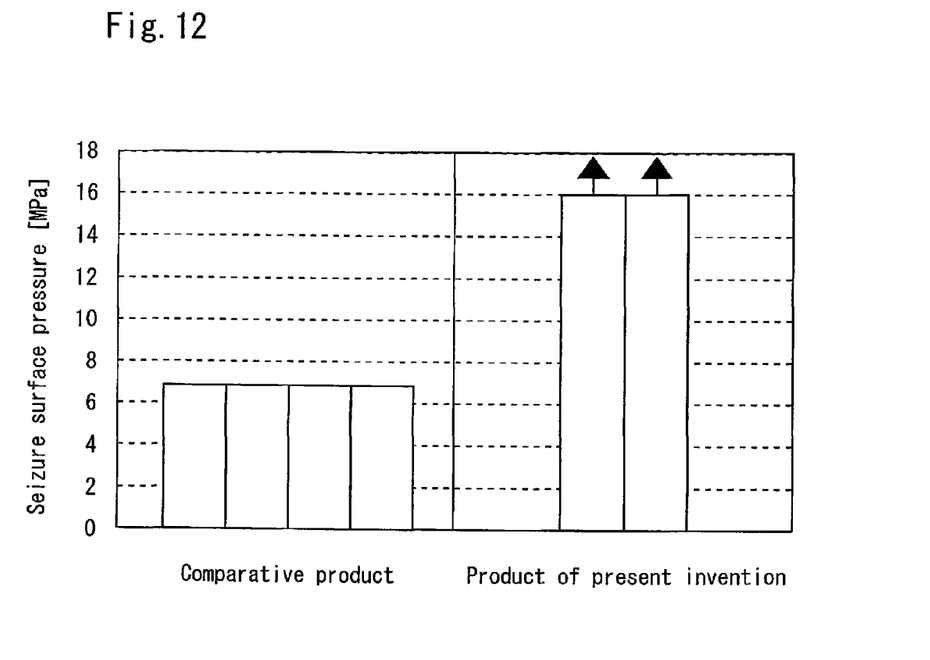
FIG. 12 is an explanatory drawing explaining the effects of a product of the present invention shown in FIG. 11.

Further, FIG. 12 shows the test results on the seizure resistance of the product of the present invention described above and a comparative product. As the comparative product, a quenched material 1A having a hardness of Hv 750 with a sliding surface 3A simply formed flatly was used.

Test conditions therefor are as follows.

Test Conditions

Atmosphere: car air-compressor intake refrigerant atmosphere

Refrigerant: R134a

Oil: refrigerating machine oil

Number of revolutions: 7200 rpm

Counterpart material: high-strength brass

Load: starting from 4.8 MPa, increased by 2.0 MPa every 15 minutes

Seizing condition judgment: at the time when the rotary drive torque of a swash plate exceeds 1.0 kg·m As understood from FIG. 12, the comparative product caused seizure at 6.8 MPa while the product of the present invention caused no seizure even at a pressure exceeding 16 MPa.

From the above, it is understood that the product of the present invention has a higher seizure resistance performance than the comparative product.

It should be noted that the above embodiment exemplifies a hemispherical shoe 1 as a sliding member, but the present invention is not limited to this and is applicable to various sliding members. Further, in the above embodiment, an annealed portion 6 was formed in the flat sliding surface 3 of the hemispherical shoe 1 but it can be formed in a hemispherical sliding surface 2.

REFERENCE SIGNS LIST

1 Hemispherical shoe
1A Hemispherical shoe material
2 Hemispherical sliding surface
3, 3A Flat sliding surface
6 Annealed portion
6A, 6B, 6C Concave portion
7 Quenched portion
8 Remaining quenched portion

The invention claimed is:

1. A sliding member having a sliding surface slidable relative to a counterpart material, wherein at least the sliding surface of the sliding member is quenched so that a quenched portion is formed, a part of the quenched portion is partially annealed so that an annealed portion is formed, and the annealed portion is deformed by pressure to have a concave surface therein when an oil film pressure acts on the sliding surface.

2. The sliding member according to claim 1, wherein the surface of the quenched portion and the surface of the annealed portion are formed to be flat and the sliding surface having the quenched portion and annealed portion formed thereon are formed to be flat.

3. The sliding member according to claim 1, wherein the surface of the quenched portion is formed to be flat and the surface of the annealed portion is formed in a concave shape.

4. The sliding member according to claim 1, wherein a quenched portion remains at a center part of the annealed portion.

5. The sliding member according to claim 4, wherein the surface of the quenched portion remaining at the center part of the annealed portion is formed to be flat.

6. The sliding member according to claim 4, wherein the surface of the quenched portion remaining at the center part of the annealed portion is formed in a concave shape.

7. The sliding member according to claim 4, wherein the surface of the quenched portion remaining at the center part of the annealed portion is formed in a convex shape.

8. The sliding member according to claim 1, wherein the annealed portion is the form of at least one of parallel linear form, concentric form, helical form, spiral form, lattice form, scattered circular form and a dot form.

9. The sliding member according to claim 1, wherein the sliding member is a hemispherical shoe, the shoe has a hemispherical sliding surface and a flat sliding surface, and the quenched portion and the annealed portion are formed on the flat sliding surface.

10. A method for manufacturing a sliding member having a sliding surface that slides relative to a counterpart material, comprising the steps of:
   quenching all of the sliding surface of the sliding member to form a quenched sliding surface;
   annealing a portion of the quenched sliding surface to form an annealed portion of the sliding surface; and
   flattening the sliding surface after the annealing step.

11. The method of claim 10, wherein a remaining quenched portion of the sliding surface is provided at a center part of the annealed portion of the sliding surface.

12. The method of claim 11, additionally comprising the step of subjecting the quenched portion of the sliding surface to tempering to form a concavity therein.

13. The method of claim 10, additionally comprising the step of forming a concavity in the surface of the annealed portion of the flattened sliding surface.

14. The method of claim 10, wherein the annealed portion of the sliding surface is in the form of at least one of parallel linear form, concentric form, helical form, spiral form, lattice form, scattered circular form and dot form.

* * * * *